May 8, 1951  A. E. BOOTH  2,552,031
TIRE INFLATING DEVICE
Filed Aug. 15, 1946  3 Sheets-Sheet 1
Fig. 3.
Fig. 1.
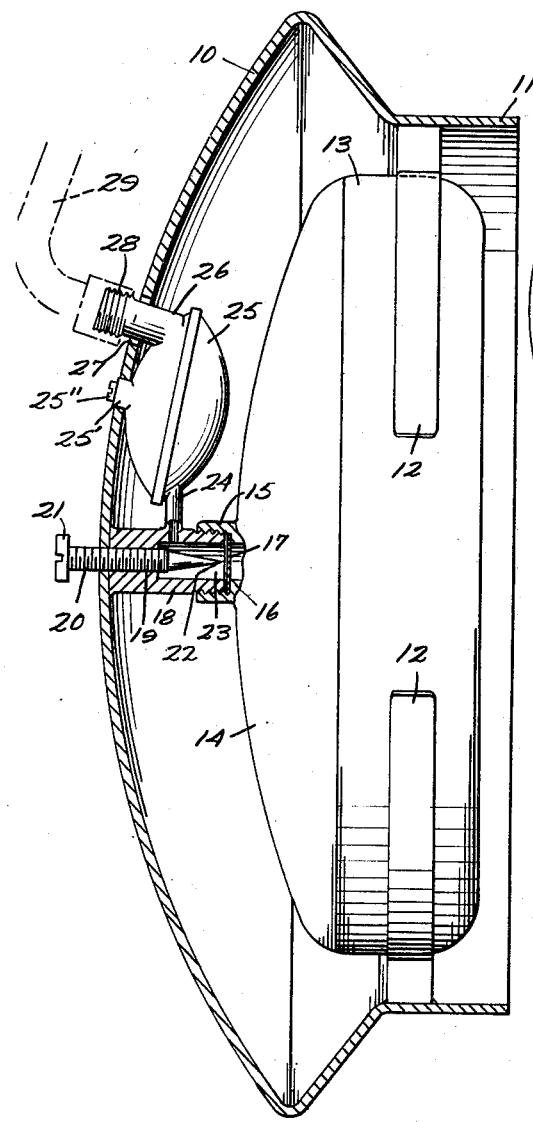
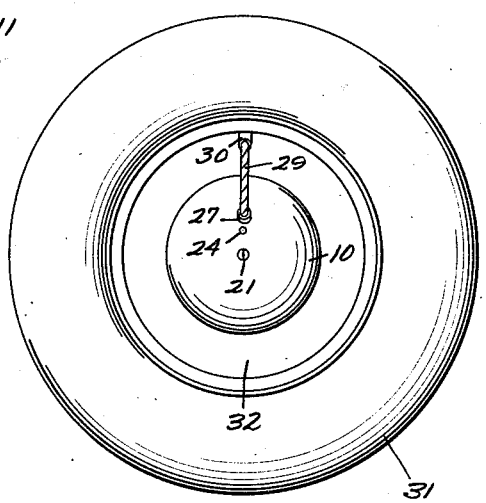
Fig. 2.
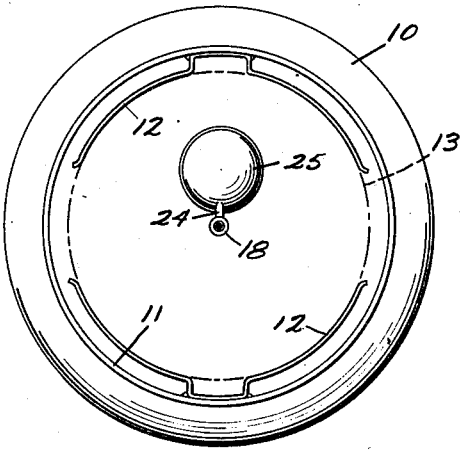
INVENTOR.
Alex E. Booth,
BY Victor J. Evans & Co.
ATTORNEYS May 8, 1951      A. E. BOOTH      2,552,031

TIRE INFLATING DEVICE

Filed Aug. 15, 1946      3 Sheets-Sheet 2

INVENTOR.

Alex E. Booth,

BY Victor J. Evans & Co.

ATTORNEYS

May 8, 1951 A. E. BOOTH 2,552,031
TIRE INFLATING DEVICE
Filed Aug. 15, 1946 3 Sheets-Sheet 3

INVENTOR.
Alex E. Booth,
BY Victor J. Evans & Co.
ATTORNEYS

Patented May 8, 1951

2,552,031

UNITED STATES PATENT OFFICE 2,552,031

TIRE INFLATING DEVICE

Alex E. Booth, Kenova, W. Va.

Application August 15, 1946, Serial No. 690,787

3 Claims. (Cl. 152—418)

This invention relates to an apparatus for inflating automobile tires.

An object of the invention is to provide a device for containing $CO_2$ (carbon dioxid) or some similar liquid gas which is adapted to be associated with the hub of an automobile wheel, and connected to the tire mounted on the wheel will inflate the tire as the pressure therein decreases below a predetermined amount while the car is in motion or at a standstill.

Another object of the invention is to provide means for controlling the flow of gas from the container into the tire for the inflation thereof.

A further object of the invention is to provide a container which is fixed to or detachable from the hub cap for containing the gas.

With the above and other objects in view, the invention consists of the novel details of construction, arrangement and combination of parts more fully hereinafter described, claimed and illustrated in the accompanying drawings in which:

Figure 1 is a front view of an embodiment of the invention as attached to the wheel of an automobile;

Figure 2 is a rear view of the device per se;

Figure 3 is an enlarged detailed vertical sectional view thereof;

Figure 5:
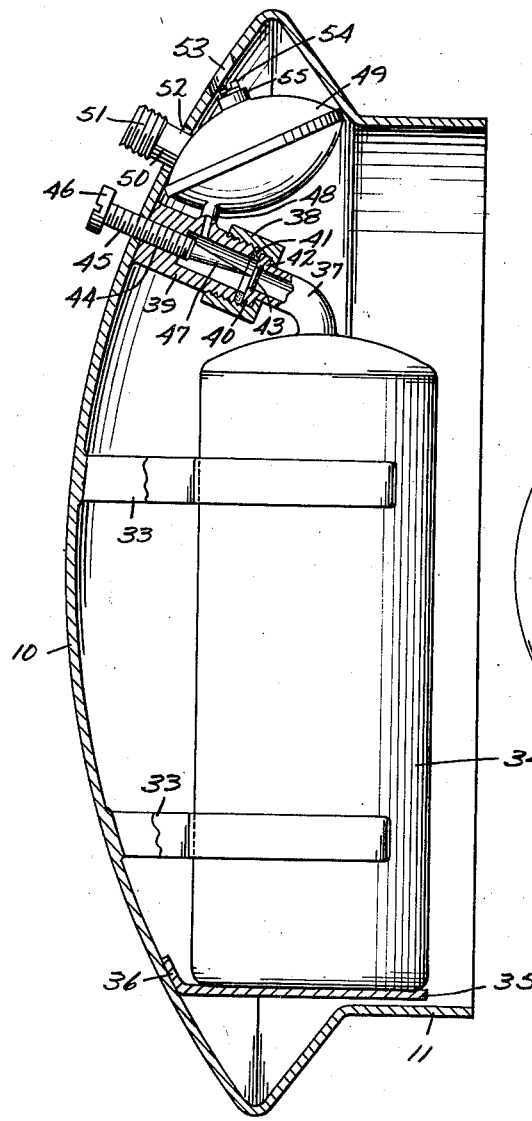
Figure 5 is an enlarged detailed vertical sectional view of Figure 4.

Referring more in detail to the drawing, the reference numeral 10 desginates a hub cap designed to be used with the wheel of an internal combustion engine.

The hub, at the rear thereof, is provided with an annular flange 11, and secured to this flange inwardly thereof are the diametrically opposed spring clamps or clips 12 which are adapted to support the circular container 13.

The container has a curved top or front 14 which is provided at the center thereof with the partially internally threaded boss or connection 15. At the rear edge of the threaded portion, there is provided a shoulder 16 which is adapted to engage the disc seal 17 on one side thereof.

Secured to the hub 10, at the center thereof in alinement with the boss or connection 15 of the container 13 by welding or the like, is a plunger housing 18, the end of which is threaded to receive the boss or connection 15 and the boss is threaded onto the housing 18 until the housing is in contact with the opposite side of the disc seal 17.

The housing 18 is provided with a threaded bore 19 in which is threadably mounted the screw threaded plunger 20.

On the outer end of the plunger which extends outwardly of the hub 10, there is provided a slotted head 21 whereby, with the aid of a screw driver, the plunger can be threaded inwardly in the housing until the conical shaped end 22 thereof penetrates and punctures the disc seal 17 for a purpose to be later described.

The housing 18 is provided at its threaded end with a chamber 23 into which the plunger extends, and by a duct 24, the housing is connected to a reducing valve 25 having an outlet nipple 26 extending through and outwardly of the hub 10 by means of the aperture 27 in the hub. The outlet 26 is threaded at its outer end at 28 to receive a flexible hose 29 which is connected to the valve 30 of the inner tube of the tire 31 mounted on the wheel 32 on which the hub 10 is mounted.

The valve 25 is of the automatic diaphragm reducing type, and is provided with a threaded boss 25' for the adjusting screw 25'' which extends outwardly of the hub 10.

Each hub for each wheel can be so equipped or a spare hub can be carried in the automobile which can be substituted for the hub of the wheel having a flat tire.

In operation, the container 13 is filled with $CO_2$ or a similar liquid gas, the disc seal 17 is inserted to close the outlet, and prevent the escape of gas, and the container is then mounted on the housing 18. For using the device to maintain pressure at all times, the plunger 20 is threaded inwardly until the disc is punctured, and then slightly retracted to permit the escape of the gas. The valve is adjusted by means of the screw 25'' and when the hose 29 is connected to the valve 30 of the tube, the pressure therein will be maintained even though a puncture is developed therein. Continuous leaking of the air and gas from the tube will eventually deflate the tube, but the tube will remain inflated a sufficient time to permit the driver of the automobile to safely reach a tire repair shop.

Should it be desired to wait until a puncture actually develops, the disc 17 is not punctured until the tube has been repaired and it is again desired to inflate the tube to the correct pressure.

Figure 4:
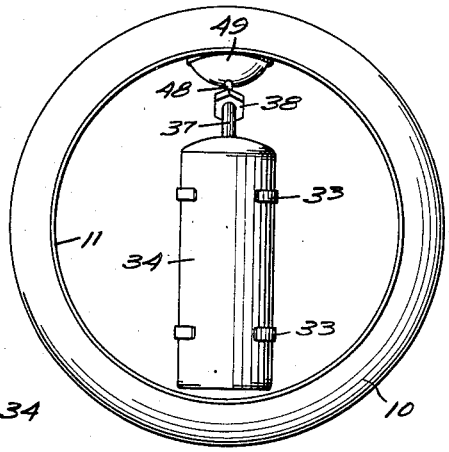
Figure 4 is a rear view of the hub showing a modified form of the invention.

In Figures 4 and 5, the hub 10 is provided on the inner curved face thereof with spring clips or clamps 33 which are secured by welding or the like, and are adapted to support the high pressure cylinder 34. The clips are in alinement with each other and the container rests on a plate 35 having a flange 36 which is secured to the inner face of the hub below the clips 33 but in alinement therewith.

The cylinder 34 has an outlet or nipple 37 at the top thereof, and a threaded coupling 38 is provided on the end thereof for connection to the threaded portion of the housing 39 which is similar to housing 18 but is secured by welding or the like adjacent the periphery of the hub.

The coupling engages the shoulder 40 formed on the end of the outlet 37, and the coupling is tightened until the housing and shoulder firmly engage the gasket 41 therebetween to provide an air and gas tight connection.

The shoulder is provided with an annular slot 42 for mounting the disc seal 43 which is similar to the disc seal 17.

The housing 39 has the threaded bore 44 for threadably mounting the screw threaded plunger 45 and the plunger extending outwardly of the hub 10 is provided with the slotted head 46 for the purpose previously described. The plunger 45 as is the plunger 20, is provided with the conical end 47 for penetrating or puncturing the disc seal 43.

The housing 39 is provided with a chamber at its threaded end through which the plunger 45 extends, and a duct 48 communicating with the chamber connects the reducing valve 49 thereto. This valve is similar to valve 25, and is provided with the outlet connection 50 having the threaded end 51 for connection to the flexible hose 29 as previously described, the outlet extending outwardly of the hub 10 by means of the aperture 52 therein.

An aperture 53 outwardly of the aperture 52 in alinement therewith permits access to the adjusting screw 54 of the valve 49 which is mounted in the threaded boss 55 on the valve 49 and the valve is controlled as previously described.

Except for the peculiar mounting thereof, and the exchange of the cylinder 34 for the container 13, this form of the invention operates as previously described.

Figure 6:
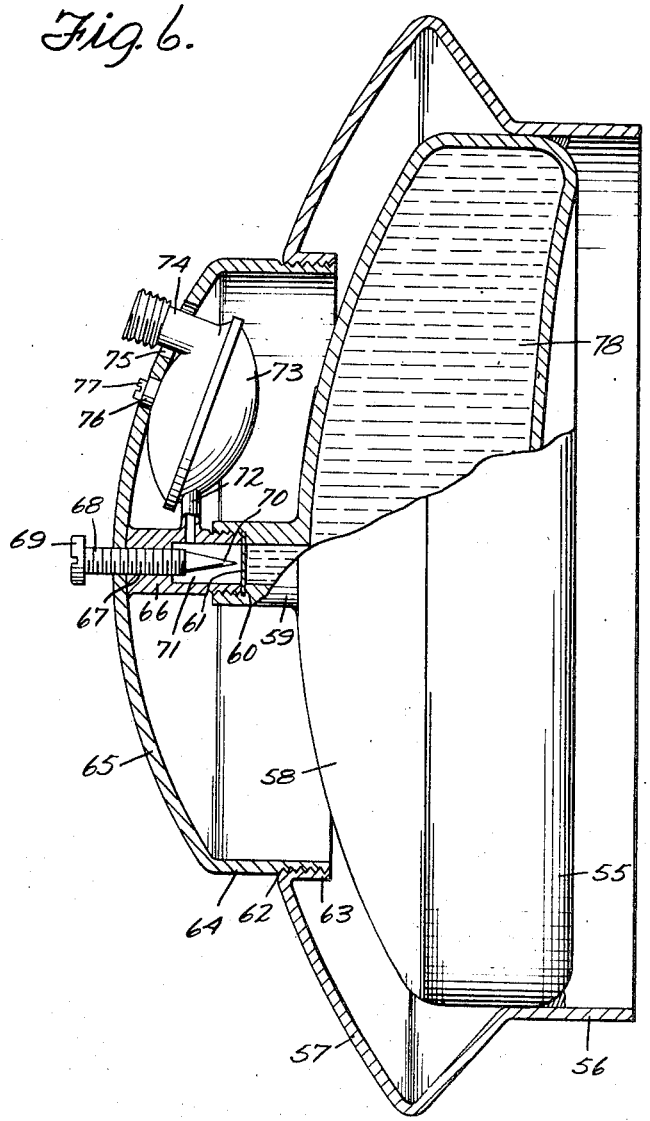
Figure 6 is an elevational view partly in section of another modification of the invention.

In the modification shown in Figure 6, the container 55 is secured to the annular flange 56 of the hub 57 by welding or the like or the container may be cast integral therewith. The container 55 is similar to container 13 having a curved top or front 58 which is provided at the center thereof with the partially internally threaded boss or connection 59. At the rear end of the threaded portion there is provided a shoulder 60 which is adapted to engage the disc seal 61 on one side thereof.

The hub 57 is provided with a central opening 62 having the inturned annular threaded flange 63 which is adapted to be threadably connected to the threaded annular flange 64 of the circular cup shaped member 65.

Secured to the inner face of member 65 at the center thereof by welding or the like is a plunger housing 66 which is in alinement with the boss 59 of the container so the housing can be threaded therein until the housing engages the opposite side of the disc seal 61.

The housing 66 is provided with a threaded bore 67 in which is threadably mounted the screw threaded plunger 68 on the outer end of which is provided a slotted head 69 which extends outwardly of the member 65 for the purpose previously described.

The plunger 68 is provided with the conical shaped end 70 for penetrating and puncturing the disc seal 61 and the housing is provided with a chamber 71 at its threaded end through which the plunger extends.

A duct 72 communicating with the chamber 71 is connected to a reducing valve 73 which is provided with an outlet 74 which extends outwardly of the member 65 by means of an aperture 75 therein, and a threaded end on the outlet 74 permits connection to the hose 29.

A threaded boss 76 on the valve 73 mounts the adjusting screw 77 which extends outwardly of the member 65 for the purpose previously described.

Except for the fact that the container 55 is welded to the hub 57 and the controlling mechanism for the container is mounted on the member 65 which is removable from the hub 57, the operation of this form of the invention is as previously described.

The $CO_2$ or other gas 78 in the containers can be compressed to 1,000 times its standard volume by inserting it in the containers in the form of Dry Ice, and the containers are of a size to receive the equivalent of a four inch cube which would contain approximately one twenty-seventh of a cubic foot.

The tire capacity is approximately one cubic foot, and normal tire pressure is about twice standard pressure, so that it would be possible to refill a tire at least ten times from the containers.

The device as stated can be used continually to maintain tire pressure or can be used to maintain pressure until the driver reaches a service station in case the tube is punctured. The reduction valves can be set to any predetermined pressure for the maintenance of the pressure in the tube.

It is believed that from the foregoing description, the operation and construction of the invention will be apparent to those skilled in the art, and it is to be understod that changes in the minor details of construction may be resorted to, provided they fall within the spirit of the invention and the scope of the appended claims.

Having thus described the invention, what is claimed as new and desired to be secured by Letters Patent is:

1. In a tire inflating device of the character described, in combination with the hub cap of the wheel of an automobile, a container of gas supported thereby, said container being provided with a seal-controlled outlet, an air hose connection extended from said hub cap and communicating with said seal controlled outlet, means mounted on said hub cap for puncturing said seal whereby gas passes from said container into said connection, and a gas pressure reducing element in said connection and mounted in said hub cap through which gas is supplied to a tire to be inflated.

2. A motor vehicle wheel hub cap comprising a body having an arcuate outer wall and having a cylindrical mounting flange, a sealed container positioned in said hub cap, a reducing valve positioned in said hub cap and installed between the container and outer wall of the hub cap, the outer end of an outlet for said reducing valve extended from the said hub cap and having threads thereon for receiving an air hose connection, and means puncturing the said sealed container whereby communicating means is established between the interior of the container and the outlet nipple.

3. In a motor vehicle wheel hub cap, the combination which comprises a comparatively hollow shell having an arcuate outer wall and provided with a cylindrical mounting flange, a sealed container having a boss extended therefrom positioned in said hub cap, a reducing valve positioned in said hub cap and connected to the boss of the container, a sealing disk positioned in the said boss of the container, a screw having a pointed inner end threaded in the said hub cap and positioned whereby the said pointed inner end punctures the sealing disk as the screw is screwed inwardly, and an air hose connection extended through the outer wall of the hub cap and connected to said reducing valve.

ALEX E. BOOTH.

REFERENCES CITED

The following references are of record in the file of this patent:

UNITED STATES PATENTS

| Number | Name | Date |
| --- | --- | --- |
| 1,253,856 | Marquette | Jan. 15, 1918 |
| 2,130,220 | Ball et al. | Sept. 13, 1938 |